United States Patent [19]

Barrow et al.

[11] Patent Number: 4,894,116

[45] Date of Patent: Jan. 16, 1990

[54] PHOSPHOR ONLY ETCHING PROCESS FOR TFEL PANEL HAVING MULTIPLE-COLORED DISPLAY

[75] Inventors: William A. Barrow, Aloha; Richard T. Tuenge, Hillsboro; Hal Merritt, Aloha, all of Oreg.

[73] Assignee: Planar Systems, Inc., Oreg.

[21] Appl. No.: 296,608

[22] Filed: Jan. 13, 1989

Related U.S. Application Data

[60] Continuation-in-part of Ser. No. 161,283, Feb. 29, 1988, abandoned, which is a division of Ser. No. 58,658, May 20, 1987, abandoned, which is a continuation-in-part of Ser. No. 844,614, Mar. 27, 1986, abandoned.

[51] Int. Cl.[4] ........................ B44C 1/22; C03C 15/00; C03C 25/06

[52] U.S. Cl. .................................... 156/643; 156/630; 156/633; 156/634; 156/646; 156/651; 156/652; 156/655; 156/656; 156/659.1

[58] Field of Search ............... 156/629, 630, 633, 634, 156/643, 646, 650, 651, 652, 655, 656, 659.1, 661.1, 667

[56] References Cited

U.S. PATENT DOCUMENTS 3,914,464 10/1975 Thomasson et al. ................ 427/270

*Primary Examiner*—William A. Powell

*Attorney, Agent, or Firm*—Chernoff, Vilhauer, McClung & Stenzel

[57] ABSTRACT

A process for manufacturing a TFEL panel having a plurality of side-by-side phosphor stripes of different colors includes the steps of placing a thin film phosphor layer of a first color producing phosphor on top of transparent electrodes covered by an insulator and subjecting the phosphor to an etching process to leave thin elongate stripes. A second phosphor layer is deposited over the first phosphor stripes and the etch is repeated to leave adjacent stripes of a second color-producing phosphor. An insulating layer and a second set of electrodes are placed atop the stripes to complete the panel which is supported on a glass substrate.

7 Claims, 4 Drawing Sheets

PHOSPHOR ONLY ETCHÎNG PROCESS FOR TFEL PANEL HAVING MULTIPLE-COLORED DISPLAY

BACKGROUND OF THE INVENTION

This application is a continuation-in-part of co-pending patent application Ser. No. 161,283 filed Feb. 29, 1988, now abandoned, which is a division of Ser. No. 058,658 filed May 20, 1947, now abandoned which is, in turn, a continuation-in-part of Ser. No. 844,614 filed Mar. 27, 1986, also now abandoned, all of which are assigned to the same assignee.

The following invention relates to a multicolored TFEL panel and a process for making the same which may provide a full color display using a plurality of electroluminescent phosphor stripes having differing color-producing properties patterned on a single substrate.

AC-driven monochromatic TFEL devices such as that depicted in Inazaki, et al., U.S. Pat. No. 3,946,371 comprising five layers, namely, a pair of insulating layers sandwiching an electroluminescent phosphor layer, and a pair of electrodes in turn sandwiching the insulating layers, with the entire laminar structure being supported on a substrate of glass or other transparent material, are well known. Such TFEL devices with associated power supply, matrix-addressing and logic circuitry, are utilized as flat screen display monitors for portable computers for military and commercial applications. However, it is desirable, particularly for the purposes of improving the legibility and usefulness of such display devices, to have the information presented in more than one color. At the present time multicolored-display capability in computers is provided principally by color CRT devices but it would be desirable, particularly in applications requiring portability and light weight, that a flat screen display be available with this capability as well.

Such displays have been provided in the past by the use of TFEL panels having multiple layers of electroluminescent material of differing color-producing capabilities. Such a device is shown in Chang, U.S. Pat. No. 4,155,030. The device of the Chang patent includes multiple layers of electroluminescent materials wherein each layer includes a phosphor having a different color-emitting characteristic. This technique, however, requires multiple transparent layers of electroluminescent materials and insulators. Some disadvantages to a multicolored, multilayered structure include the requirement for a larger number of electronic devices and interconnections to the layers, more complex drive electronics, and cost. There may also be parallax effects and cross-talk with multilayered, multicolored screens. The most important disadvantage is that this structure has never been made reliable. All known devices of this type exhibit catastrophic failure modes.

SUMMARY OF THE INVENTION

The present invention utilizes a single layer which includes a plurality of stripes of phosphor material having differing light-emitting and color-producing capabilities. The stripes are arranged as parallel lines on a substrate so that the different types of color-producing phosphor material to be utilized in the display alternate from one stripe to the next n a predetermined sequence. For example, if red, green and blue are the colors to be utilized in the screen, the phosphors having these color-emitting properties will be patterned on the screen in stripes according to the sequence red-green-blue. This sequence will repeat across the substrate.

Each color-producing stripe will have a row or column electrode uniquely associated with it so that the electrode is arranged co-linearly with the stripe but separated from the stripe by an insulator. In this way the energization of each color-producing stripe may be separately controlled by the panel's drive electronics. Column electrodes are used so that pixel capacitance may be minimized. An example of a drive scheme suitable for use with such a structure is shown in a co-pending patent application Ser. No. 729,974 entitled Driving Architecture For Matrix Addressed TFEL Display filed Apr. 30, 1985, now U.S. Pat. No. 4,739,320, which is assigned to the same assignee.

The color stripes may be etched one color at a time using a dry etching process. Each color may comprise a laminate including a top insulating layer, a phosphor layer, and a bottom insulating layer. Alternately the phosphor layers may be etched without etching the top and bottom insulators at the same time. A "stop" layer which resists the etching process may be used on at least the first laminate. This prevents the etch from damaging the row electrodes during the etching of the first color laminate, and makes it possible to stop the etch between the top insulator of one laminate and the bottom insulator of the next laminate in etching the second and third color laminates.

The process includes depositing a first set of parallel elongate electrodes on a substrate, depositing an insulating layer on top of the electrodes, and placing a first color thin film phosphor on top of the insulator. The color producing phosphor is etched to leave stripes extending perpendicular to the electrodes. An etch stop layer is placed on top of the stripes, and a second thin film comprising a second color-producing phosphor is placed on top of the etch stop layer. The second phosphor is then etched to leave stripes of a second color producing phosphor lying adjacent to and extending parallel to the first stripes. Finally, a top insulating layer and a second set of electrodes is deposited over the first and second stripes to extend colinearly with each of the stripes respectively.

It is a primary object of this invention to provide a compact and inexpensive multicolored TFEL screen.

Yet a further object of this invention is to provide a multicolored TFEL screen through the use of a matrix including stripes of phosphors having differing color-producing properties arranged in side-by-side relation across a single substrate.

Yet a further object of this invention is to provide a dry etching process for making a multicolor screen of the character described above.

The foregoing and other objectives, features and advantages of the present invention will be more readily understood upon consideration of the following detailed description of the invention taken in conjunction with the accompanying drawings.

DETAILED DESCRIPTION OF THE INVENTION

Figure 1:
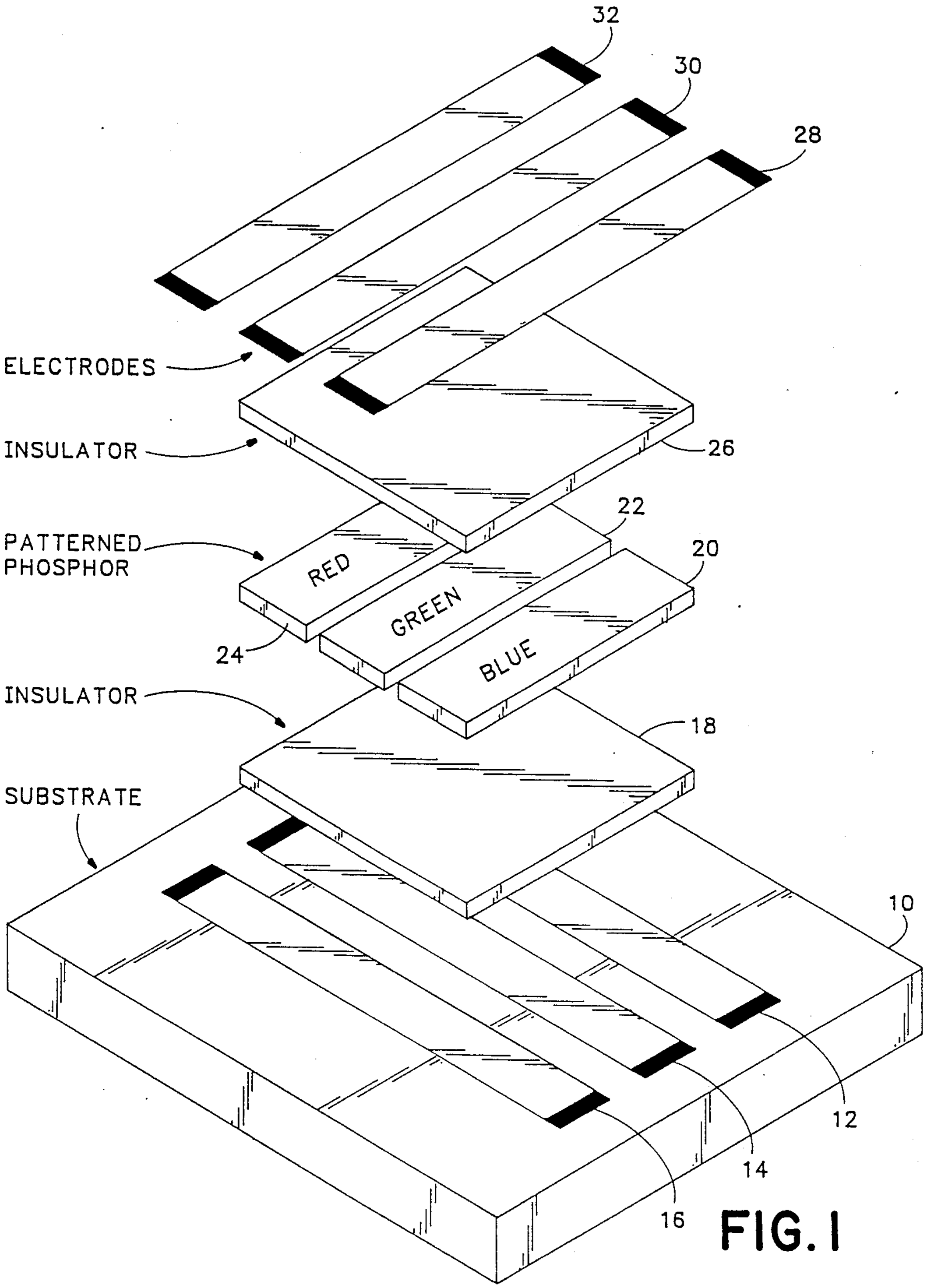
FIG. 1 is an exploded perspective view of a portion of the structure of a multicolored TFEL screen constructed according to the present invention.

Referring to FIG. 1, a substrate 10 which may be constructed of glass, for example, includes row electrodes 12, 14 and 16, respectively. A thin layer of insulating material 18 is deposited on top of the substrate covering the row electrodes. The row electrodes 12, 14 and 16 are transparent electrodes, the construction of which is well known in the art. Stripes of patterned phosphors 20, 22 and 24 are placed on top of the insulating layer 18. Covering the patterned phosphor stripes 20, 22 and 24 is a second insulator 26. Column electrodes 28, 30 and 32 are placed on top of insulator 26 and are disposed parallel with respect to the patterned phosphor stripes 20, 22 and 24 and perpendicular to the row electrodes 12, 14 and 16.

At a viewing angle which is normal to the front of the screen 10 the intersection between one of the row electrodes 12, 14, or 16 and three of the column electrodes 28, 30 and 32 forms a single pixel. The pixel may be colored either red, green or blue depending upon which of the column electrodes are energized, or may emit light which is a combination of two or more of the patterned phosphor stripes 20, 22 and 24. Thus, a gray code may be employed regulating the relative intensity level of the light emitted by any combination of stripes 22, 20 and 24 to provide a full color display.

The red, green and blue patterned phosphors stripes 24, 22 and 20, respectively, are patterned across the screen 10 in repeating groups utilizing the same red-green-blue sequence. The fact that the different colored stripes are patterned on the substrate 10 in side-by-side relation make this structure especially appropriate for thin-film transistor driving techniques. In such a case a thin-film switching and/or control circuit may be used for each intersection of a patterned phosphor stripe with its orthogonally-disposed electrode. For example, the intersection of electrode 32 and patterned phosphors stripe 24 would form a single pixel which may be controlled by a thin-film switching and/or control circuit dedicated to that pixel and located adjacent to it.

Appropriate materials for the patterned phosphor stripes include strontium sulfide doped with cerium fluoride ($SrS{:}CeF_3$) for producing a blue color; zinc sulfide doped with terbium fluoride ($ZnS{:}TbF_3$) for producing a green color; and calcium sulfide doped with Europium CaS:Eu for producing a red color. Also, any of the above materials could be used with each other or with yellow-emitting ZnS:Mn to produce screens having only dual color characteristics.

Figure 2:
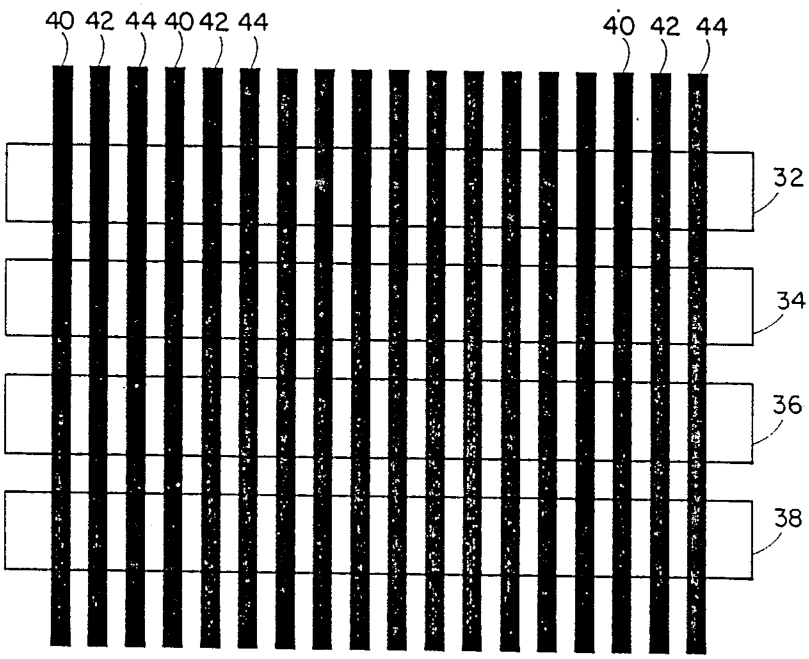
FIG. 2 is a schematic plan view of a portion of a multicolored screen constructed according to the process of the invention.

Referring now to FIG. 2, row electrodes 32, 34, 36 and 38 are deposited on the substrate (not shown in FIG. 2). Electrodes 32, 34, 36 and 38 are scanning or row electrodes which are scanned in sequence once per frame in a predetermined scanning pattern, usually from top to bottom. These electrodes are constructed of transparent material, usually indium tin oxide (ITO). These electrodes may be made relatively wide to provide maximum conductivity. This is important because the ITO transparent conductive material has a relatively high sheet resistance. Making these lines wide increases their conductivity which, in turn, permits rapid charging. Data electrodes 40, 42 and 44 are placed on the screen after the etching process to be described below. Each of the data electrodes 42, 40 and 44 sandwich a phosphor stripe of a predetermined color. In a full color screen, for example, electrode 40 may be dedicated to a phosphor which emits a blue color, electrode 42 may be dedicated to a phosphor which emits a green color, and electrode 44 may be dedicated to a phosphor which emits a red color. The electrodes 40, 42 and 44 are typically constructed of aluminum which has a low sheet resistance and can therefore be narrow without significantly increasing the time that it takes to fully charge. The column or data electrodes are energized with a relatively low modulation voltage, which, when added algebraically with the relatively high scanning voltages on the scanning electrodes 32, 34, 36 and 38, cause the phosphor material sandwiched therebetween to emit visible light. The color stripes are arranged so that they are energized by data electrodes 40, 42 and 44. Thus, each pixel comprises the intersection of a scanning electrode and three data electrodes 40, 42 and 44. This is more efficient than splitting the pixels in the row direction because for each pixel a column would need to be energized three times as fast and three times as often. For example, electroluminescence may be caused by charging the scanning electrodes in sequence with a voltage of minus 160 volts and selectively energizing data electrodes such as electrodes 40, 42 and 44 with a voltage of approximately 50 volts. This creates a composite voltage across the panel, for lit pixels, of 210 volts which is sufficient to cause luminescence. This arrangement provides low power operation of the panel and permits a high refresh rate. It also provides greater reliability since the top electrodes do not have to cross the edges of the phosphor stripes.

Figure 3A:
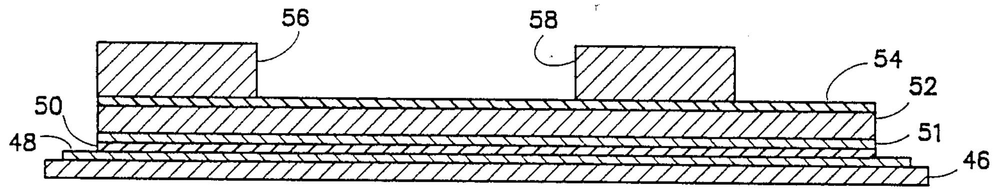
FIG. 3A is a sectional view of a portion of a TFEL panel undergoing the first step of the etching process of the present invention.
Figure 3B:
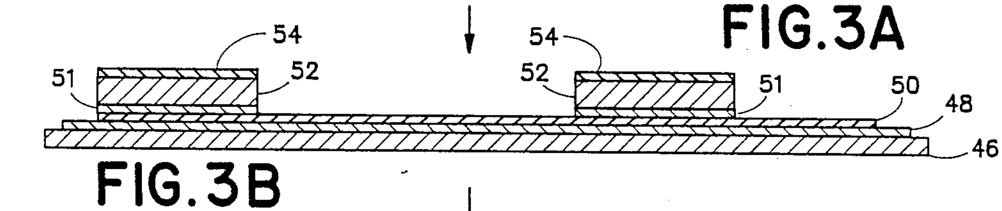
FIG. 3B is a sectional view of the TFEL panel of FIG. 3A subsequent to the first etching step of the process of the invention.
Figure 3C:
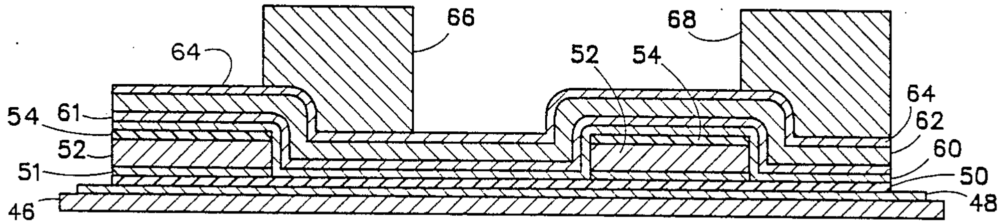
FIG. 3C is a sectional view of the TFEL panel of FIG. 3A undergoing the second etching step of the process of the invention.
Figure 3D:
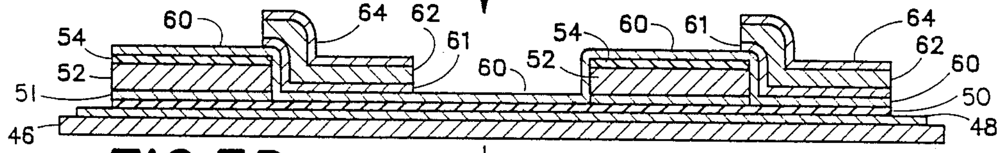
FIG. 3D is a sectional view of the TFEL panel of FIG. 3C subsequent to the second etching step of the etching process of the invention.

Referring to FIG. 3A, substrate 46 supports an ITO electrode layer 48. According to the process of the invention, a laminate film comprising a "stop" layer of aluminum oxide 50, a bottom dielectric layer 51, a light-emitting phosphor layer 52 of a first color, and a top insulator layer 54 is deposited atop the ITO electrode layer 48. The stop layer may be composed of $Al_2O_3$ and have a thickness of 200 A. Next, a mask which may include photoresistive strips 56 and 58 is placed atop the phosphor laminate comprising layers 50, 51, 52 and 54. The panel of FIG. 3A is placed in a plasma or reactive ion etching machine where it is treated with a corrosive gas in the presence of a high-intensity electric field. As a result, the top insulator layer 54 and the phosphor layer 52 and the bottom insulator 51 are etched away from the stop layer 50 except in regions covered by photoresistive mask strips 56 and 58. Subsequently in FIG. 3C a second thin-film phosphor laminate comprising a stop layer 60, a bottom insulator 61, a color-producing phosphor layer of a second color 62 and a top insulator layer 64 is deposited on the substrate 46. A second mask comprising strips of photoresistive material 66 and 68 is arranged atop the second thin-film phosphor laminate and the panel is once again subjected to the dry etching process. This time, however, the photoresistive strips 66 and 68 are dimensioned so that the second thin-film laminate overlaps the first thin-film phosphor stripes 52. This overlap prevents the ITO layer in the region between lines of different colors from being etched through by repeated exposure to the corrosive gas as each color pattern is defined.

Figure 3E:
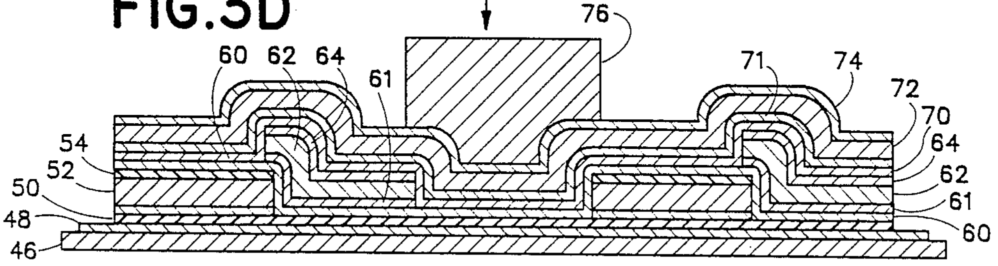
FIG. 3E is a sectional view of the TFEL panel of FIG. 3D prepared for the third etching step of the present invention.
Figure 3F:
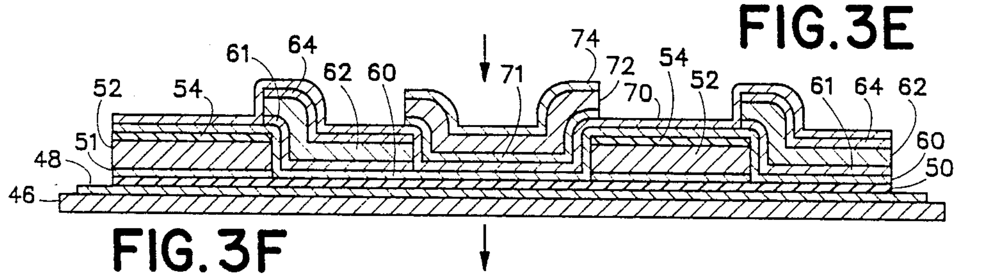
FIG. 3F is a sectional view of the TFEL panel of FIG. 3E subsequent to the third etching step of the present invention.
Figure 3G:
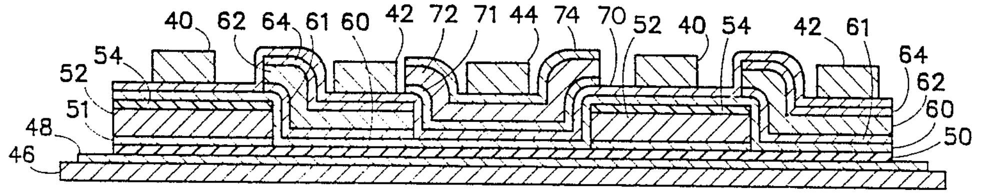
FIG. 3G is a sectional view of the TFEL panel of FIG. 3F with column electrodes deposited on each color-producing phosphor laminate.

Referring to FIG. 3E a third thin-film laminate comprising a stop layer 70, a bottom insulator 71, a phosphor layer of the third color-producing phosphor 72 and a top insulator layer 74 are deposited on top of thin-film phosphor stripes 52 and 62 and their top insulators. A mask containing photoresistive material 76 is placed atop the stack and the panel is once again placed in the etcher. The result is shown in FIG. 3F wherein portions of all three thin-film laminates are arranged as overlapping phosphor stripes 52, 62 and 72 on substrate 46. The last step of the process, which is shown in FIG. 3G, comprises placing top electrodes 40, 42 and 44 extending colinearly and on top of the individual phosphor stripes 52, 62 and 72.

In some cases it may be desirable to omit the bottom stop layer 50 or in the alternative, to omit stop layers 60 and 70. If the etch process can be closely monitored, for example, using a laser interferometer and/or an optical spectrometer, it may be possible to know when the etch process has reached the ITO layer. Subsequent laminate layers may use a stop layer to closely control the etching process and make sure that the process is halted when the stop layer has been reached.

An alternative process which is simplier than the process illustrated in FIGS. 3A through 3G is shown in FIGS. 4A through 4E. This process is known as a "phosphor only" etching process in which a first insulating layer is deposited before etching and the second insulating layer is deposited after etching is completed so that the etch itself involves only the color producing phosphor layers.

Referring to FIGS. 4A through 4E, a substrate 100 supports row electrodes 102 which may be fabricated from indium tin oxide (ITO). First, an insulating layer 104 is deposited on top of the ITO layer 102. Next, a thin etch stop layer 106 is deposited on top of the insulating layer 104 and a phosphor layer of a first color 108 is deposited atop the etch stop layer 106. Strips of a photoresistive mask 110 cover portions of the thin film phosphor layer of the first color producing phosphor 108 and the panel thus arranged is subjected to a conventional etching process which may be the dry etching process described in connection with FIGS. 3A through 3G. When the photoresistive mask 110 is removed, what remains are elongate stripes 109 of a first color producing phosphor.

Figure 4A:
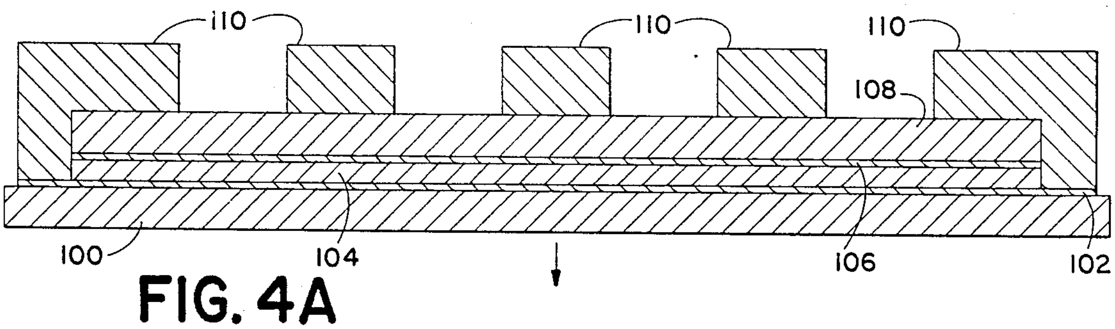
FIGS. 4A–4E illustrate an alternative process, which does not etch the insulating layers along with the phosphor layers.
Figure 4B:
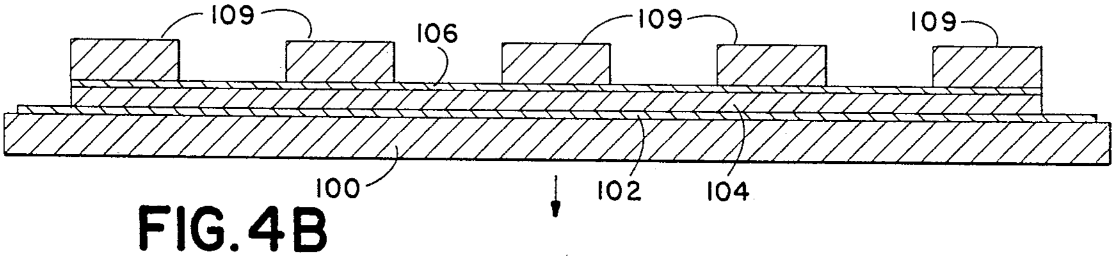
Figure 4C:
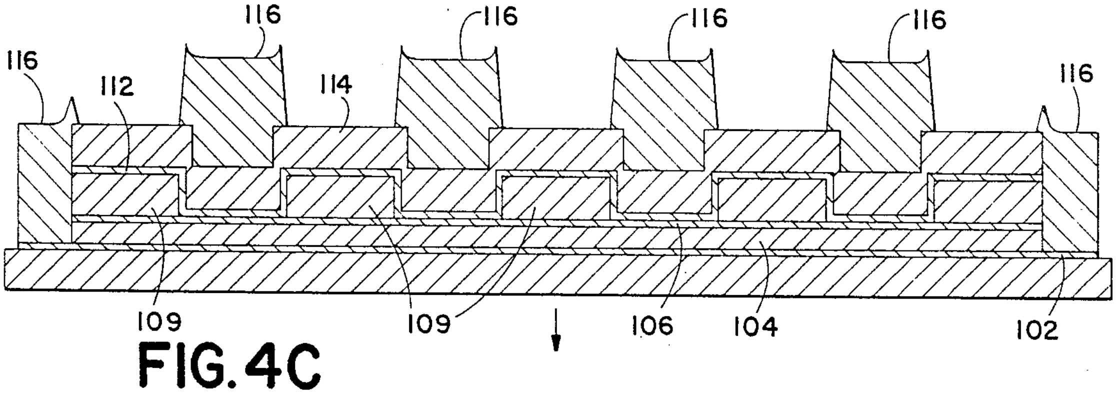
Figure 4D:
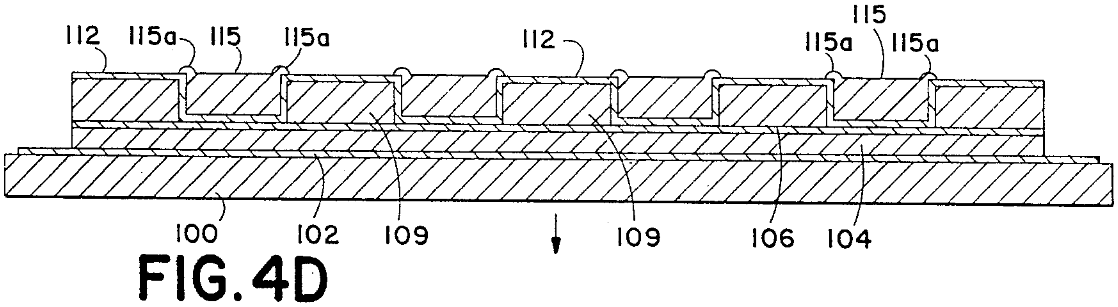

As shown in FIG. 4C, after the first etching step of FIG. 4B, an etch stop layer 112, is laid across the stripes 109. The layer 112 is $Ba_2TaO_6$ and is 200 Å thick. An $Al_2O_3$ layer of the same thickness could also be used. A thin film layer of a second color producing phosphor 114 is deposited on top of the etch stop layer 112, and a second photoresistive mask 116 is placed across portions of the second thin film phosphor layer 114. The panel thus arranged is etched a second time to produce stripes 115 of a second color producing phosphor. The mask 116 is arranged to provide overlap portions 115*a* of each color producing stripe 115. This occurs because of the slight overlap of the mask 116 onto the portions of the etch stop layer 112 covering stripes 109 when the dry etching process is performed a second time. This results in the configuration of the panel shown in FIG. 4D.

Figure 4E:
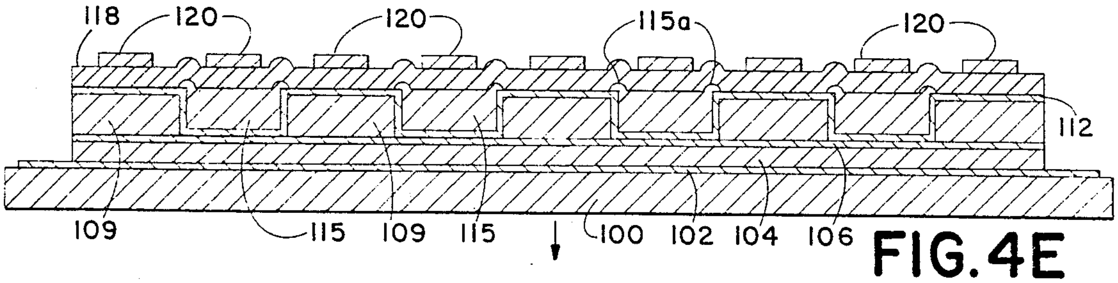

The panel is completed as shown in FIG. 4E by depositing a second insulating layer 118 and a set of column or data electrodes 120 over the layer 118 which overlie and are colinear with each of the respective color producing phosphor stripes 109 or 115.

The process shown in FIGS. 4A through 4E could include three phosphor stripes of different color producing phosphors instead of two as shown. In such a case the three stripes would comprise the three primary colors red, green and blue, to produce a full color panel. When two colors are used as shown in FIGS. 4A through 4E, the colors may be red and green and may thus constitute the front panel portion of a hybrid full color TFEL device as shown in copending patent application Ser. No. 116,728 filed Nov. 4, 1987 entitled FULL COLOR HYBRID TFEL DISPLAY SCREEN now U.S. Pat. No. 4,801,844, which is assigned to the same assignee.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method of constructing a multicolored TFEL display screen comprising the steps of:
   (a) depositing on a substrate a first set of elongate transparent electrodes;
   (b) depositing an insulating layer on top of said electrodes;
   (c) depositing over said insulating layer a first thin film comprising a first color-producing phosphor;
   (d) etching said first thin film to leave stripes of said first color-producing phosphor extending perpendicular to said transparent electrodes;
   (e) depositing an etch stop layer on top of said stripes of said first thin film;
   (f) depositing a second thin film comprising a second color-producing phosphor on top of said etch stop layer;
   (g) etching said second thin film to leave stripes of a second color-producing phosphor lying adjacent to and extending parallel to said stripes of said first color-producing phosphor; and
   (h) depositing an insulating layer and a second set of elongate electrodes over said first and second stripes to extend colinearly therewith.

2. The method of claim 1 wherein said first set of transparent electrodes are scanning electrodes and said second set of electrodes are data electrodes.

3. The method of claim 1 wherein said etching steps are performed by a dry etching process.

4. The method of claim 3 wherein said etch stop layer is composed of $Ba_2TaO_6$.

5. The method of claim 4 wherein the thickness of said etch stop layer is about 200 Å.

6. The method of claim 3 wherein said dry etching process comprises placing a photoresistive mask over said thin films and exposing said thin films to a corrosive gas within an electric field, said mask comprising elongate photoresistive strips corresponding to the dimensions of said phosphor stripes.

7. The method of claim 1 further including the step of depositing an etch stop layer on top of said insulating layer prior to performing step (c).

* * * * *